(12) United States Patent
Kasevich et al.

(10) Patent No.: US 10,444,016 B1
(45) Date of Patent: Oct. 15, 2019

(54) AUTOMATIC BIASING AND CLOSED LOOP CONTROL OF AN ATOMIC INTERFEROMETER

(71) Applicant: AOSense, Inc., Sunnyvale, CA (US)

(72) Inventors: Mark A. Kasevich, Palo Alto, CA (US); Michael R. Matthews, Palo Alto, CA (US); Micah Ledbetter, Sunnyvale, CA (US); Ying-Ju Wang, Boulder, CO (US); Martin M. Boyd, Sunnyvale, CA (US)

(73) Assignee: AOSense, Inc., Sunnyvale, CA (US)

( * ) Notice: Subject to any disclaimer, the term of this patent is extended or adjusted under 35 U.S.C. 154(b) by 0 days.

(21) Appl. No.: 16/019,042

(22) Filed: Jun. 26, 2018

(51) Int. Cl.
*G01C 19/58* (2006.01)
*G21K 1/00* (2006.01)
*H05H 3/02* (2006.01)

(52) U.S. Cl.
CPC ............. *G01C 19/58* (2013.01); *G21K 1/006* (2013.01); *H05H 3/02* (2013.01)

(58) Field of Classification Search
USPC .......................................................... 250/251
See application file for complete search history.

(56) References Cited

U.S. PATENT DOCUMENTS

| | | | | |
|---|---|---|---|---|
| 4,874,942 A | * | 10/1989 | Clauser ................. | G01C 19/58 250/251 |
| 5,274,231 A | * | 12/1993 | Chu ....................... | G01C 19/58 250/251 |
| 8,288,712 B2 | * | 10/2012 | Bouyer ................... | H05H 3/02 250/251 |
| 9,019,506 B1 | * | 4/2015 | Black ...................... | G01B 9/02 356/450 |
| 9,772,175 B2 | * | 9/2017 | Black ...................... | G01B 9/02 |

* cited by examiner

*Primary Examiner* — Phillip A Johnston
(74) *Attorney, Agent, or Firm* — Van Pelt, Yi & James LLP (57) ABSTRACT

A system for an atomic interferometer includes a laser control system and a feedback control system. The laser control system controls a first pointing angle of a first interrogating laser beam. The first interrogating laser beam and a second interrogating laser beam interrogate a pair of almost counter-propagating laser cooled atomic ensembles. The feedback control system adjusts the first pointing angle based at least in part on an inertial measurement using the atomic interferometer to bias an output of the atomic interferometer to compensate for the effects of rotations. The pointing angle of the laser beam, which is linearly related to a frequency used to drive an acousto-optic deflector, is linearly related to the rotation rate of the sensor.

19 Claims, 8 Drawing Sheets

| Interrogation pulse | AOD frequency for deflected beam 1 | AOD frequency for deflected beam 2 | WGM frequency |
|---|---|---|---|
| First | $f_{AOD1}$ | $f_{AOD2}$ | $f_{WGM}$ |
| Second | $f_{AOD1} + \Delta_r/2 + \delta$ | $f_{AOD2} - \Delta_r/2$ | $f_{WGM} - \Delta_r + \Delta_a - \delta$ |
| Third | $f_{AOD1} + \Delta_r$ | $f_{AOD2} - \Delta_r$ | $f_{WGM} - 2\Delta_r + 2\Delta_a$ |

AUTOMATIC BIASING AND CLOSED LOOP CONTROL OF AN ATOMIC INTERFEROMETER

BACKGROUND OF THE INVENTION

Matter exhibits wave-like properties similar to light. These wave-like properties of matter allow interference measurements to be exploited at a scale orders of magnitude smaller than for light because the typical de Broglie wavelengths associated with massive particles are very small compared to wavelengths associated with massless photons of visible light. An atom interferometer exploits the wave-like properties of atoms to sensitively measure small differences between different spatial trajectories. It does this by measuring the interference effects that result when it manipulates a beam of atoms such that the atomic wave packets split into two or more components and subsequently recombine. A light-pulse atom interferometer uses optical pulses that interact with ensembles of atoms (e.g., a ball or group of atoms launched from a magneto-optic trap or from an atomic beam). One important application of atomic interferometers is in inertial sensing for navigation. The phases and direction of the optical pulses can be manipulated in order to bias the output phase of the interferometer. For example, the manipulation is used to null the output phase of the interferometer and the manipulation signal then provides an interferometric measurement. In some cases, it is desirable to use a pair of interferometers that share optical pulses, and even more so, to use the pair of interferometers in a nulling configuration. Because the detected signal from the interferometer varies sinusoidally with the interferometer's phase, it is desirable to operate the device such that the phase is near zero and the response to inputs is linear. Methods exist for biasing the phase by manipulating the phase or frequency of the laser pulses. However, these methods have limited applicability to a precision atomic interferometric gyroscope which must operate at high rotation rates. Methods have also been demonstrated for inducing spatial variation of the phase across an atom cloud by mechanically manipulating the angle of a laser beam which provides one of three light pulses. Mechanical manipulation of beam angles is also undesirable for precision devices. Finally, the optical alignment requirements in cold atom interferometers are quite stringent and can be difficult to achieve.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatic biasing and closed loop control of an atomic interferometer is disclosed. The system comprises a laser control system and a feedback control system. The laser control system controls a first pointing angle of a first interrogating laser beam. The feedback control system adjusts the first pointing angle based at least in part on an inertial measurement using the atomic interferometer to bias an output of the atomic interferometer. In some embodiments, the feedback control system compensates for the effects of rotations. The pointing angle of the laser beam, which is linearly related to a frequency used to drive an acousto-optic deflector, is linearly related to the rotation rate of the sensor The system for automatic biasing and closed loop control of an atomic interferometer provides a method to bias a rotation signal such that a linear output signal results. This enables feedback for closed loop operation, feedforward for higher tolerance of dynamics, and maintenance of signal size at arbitrary rotation rates. The use of electro-optics in the device results in an improved stability over temperature and mechanical changes, enables automatic leveling of a gravimeter in two dimensions using no moving parts, and enables compensation for build errors of the optical assembly.

In some embodiments, the first interrogating laser beam and a second interrogating laser beam interrogate a pair of almost counter-propagating laser cooled atomic ensembles. In some embodiments, the first interrogating laser beam or the second interrogating laser beam interrogate the pair of almost counter-propagating laser cooled atomic ensembles at nominally perpendicular angles. For example, adjusting the direction of the interrogation beams changes the effective wavevector $k_{\mathit{eff}}$ (vector difference of the two interrogation beams) and further requires adjusting the frequency and phase of the interrogation beams. The system includes an electro-optical system to manipulate the angle of laser beams in a way that is stable and insensitive to temperature effects, aging, and other environmental effects. A feedback control system adjusts the first pointing angle based on an inertial measurement using the atomic interferometer to bias an output of the atomic interferometer. In some embodiments, the feedback control system adjusts based at least in part on calculations of phase shifts measured from the pair of almost counter-propagating laser cooled atomic ensembles. For example, a measurement is made of the difference in atom population between two ground states which depend sinusoidally on the phase accrued during an interrogation sequence. The phase accrued in an interrogation sequence includes contributions from both linear accelerations in the direction of the interrogation beams as well as from rotations about an axis transverse to both the interrogation beams and the atomic velocity. Since the phase shift due to rotations is linear in the atomic velocity and the phase shift due to acceleration is independent of atomic velocity, the two effects can be distinguished by performing measurements on two groups of atoms with opposite velocity.

Figure 1:
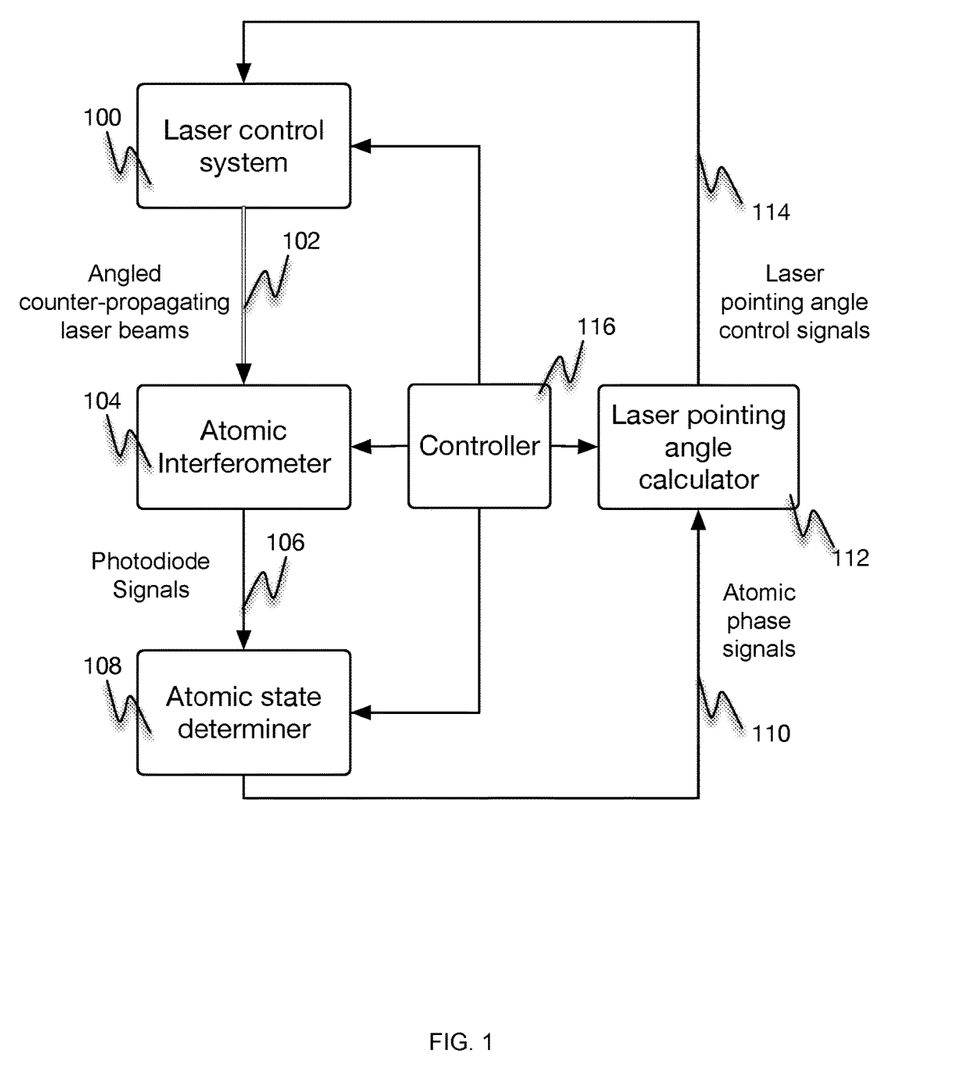
FIG. 1 is a block diagram of an embodiment of a feedback loop that maintains zero phase difference between atom clouds in an atomic interferometer such that the atomic signal is maintained at its most sensitive state while operating at arbitrary rotation rates.

FIG. 1 is a block diagram of an embodiment of a feedback loop that maintains zero phase difference between atom clouds in an atomic interferometer such that the atomic signal is maintained at its most sensitive state while operating at arbitrary rotation rates. The feedback loop comprises laser control system 100, atomic interferometer 104, atomic state determiner 108, laser pointing angle calculator 112, and controller 116. Laser control system 100 outputs a pair of angled counter-propagating laser beams 102 which enter atomic interferometer 104 and interact with cold atom clouds within the atomic interferometer. The pair of angled counter-propagating laser beams 102 are directed to intercept a group or groups of atoms at one or more interrogation regions in the atomic interferometer 104 using an optical assembly. Such an assembly may include combinations of lenses, beam splitters, beam combiners, mirrors, diffractive elements, and birefringent materials. The output angles of the deflected beams are used to control the angle of the interrogation pulses with respect to the groups of atoms, and so all means of directing the deflected beams to the groups of atoms must preserve the relative deflection angle or be related to the deflection angle. In operation, the deflection angles are set to counteract the rotation of the sensor such that the groups of atoms experience no change in direction of the effective wavevector $k_{\mathit{eff}}$ of the interrogation pulses. Photodiodes measure the fluorescence or absorption of the atom clouds after interacting with angled counter-propagating laser beams 102 and send their photodiode signals 106 to the atomic state determiner 108. Atomic state determiner 108 determines the atomic phase of the atoms in atomic interferometer 104 and sends atomic phase signals 110 to laser pointing angle calculator 112. Laser pointing angle calculator 112 computes laser pointing angle control signals 114 such that the atomic signal is maintained at its most sensitive state while operating at arbitrary rotation rates. Controller 116 coordinates the sequence of control operations of laser control system 100, atomic interferometer 104, atomic state determiner 108, and laser pointing angle calculator 112. For example, the control frequency $\Delta_r$ used to bias the interferometer against rotations is related to sensor rotation rate through $Q=\eta\Delta_r/T$ where T is the time between the interrogation pulses and $\eta$ is the conversion factor from frequency to angle at the interrogation. The actual measurement of rotation is the bias value $\eta\Delta_r/T$ plus a measured rotation rate $\Omega_m$ which is uncompensated due to changes in the rate. A similar feedback loop, for example running simultaneously on the same field programmable gate array (FPGA) or microprocessor, can be used to null the phase sum of the interferometers due to accelerations. In some embodiments, the FPGA or microprocessor are coupled to a memory (e.g., a non-transitory readable storage medium) that is configured to provide the FPGA or microprocessor instructions. Acceleration is then related to the control $\Delta_a$ via $a=\Delta_a/k_{\mathit{eff}}T$ where $k_{\mathit{eff}}$ is the effective wavevector (i.e., vector difference of the two interrogation beams).

In some embodiments, changes of the angles of one or both angled counter-propagating laser beams 102 is determined by previous measurements of rotation rate. Previous measurements may include measurements by the atom interferometer itself, by external measurement devices, or combinations thereof. Changes in the angles may be determined by proportional, integral, and differential operations on previous measurements. In some embodiments, changes in the angles of one or both deflected beams are determined by previous measurements of relative angle changes within a single measurement of rotation rate by the atom interferometer in order to feed-forward to laser pointing angle control signals 114. For example, a feed-forward system based on a 3-pulse interferometer, a second rotation sensor measures the change in angle between the first and second pulses and a correction for the accumulated rotation angle is applied to the second pulse by changing the laser pointing angle control signals sent to the electro optic devices within laser control system 100. A similar process occurs between the second and third pulses such that corrections are applied to the third pulse. The benefit of a feed-forward implementation is that the system can account for much larger changes of rotation angle during a single measurement of the rotation rate by the atom interferometer. The feed-forward system may be used with the feed-back system.

In some embodiments, even in the absence of rotations there may be misalignment of the interrogation beams due to imperfections in the optical assembly. Adjustment of the deflection angles enables compensation for these imperfections to optimize the alignment of the interrogation beams.

In some embodiments, the optical assembly may be configured such that changes in the angle of deflected beam 1 are in a different plane than changes in the angle of deflected beam 2 which comprise angled counter-propagating laser beams 102. This allows for adjustment of the optical assembly in both directions that are perpendicular to the direction of the interrogation beams. This is useful in fine level adjustment for an atomic gravimeter. For example, the gravimeters sense axis must be aligned precisely to gravity. Manipulation of deflected beams 1 and 2 can be used to align $k_{\mathit{eff}}$ with gravity in two dimensions.

Laser control system 100, which manipulates the angles of the plurality of interrogation beams, may be any electro-optical device that creates two or more deflected beams whose deflection angles are determined by electrical signals. Examples of such devices that allow optical beam steering are acousto-optic deflectors, acousto-optic modulators, acousto-optic beam deflectors, and combinations of birefringent materials and polarization controllers. Laser control system 100, which manipulates the frequency of the plurality of interrogation beams, may be any device or system that creates two or more frequency components in the interrogation beams, in which at least one frequency component is adjustable (e.g., electro-optic waveguide modulator, two or more lasers which are phase locked, and electro-optical free-space modulators).

Figure 2:
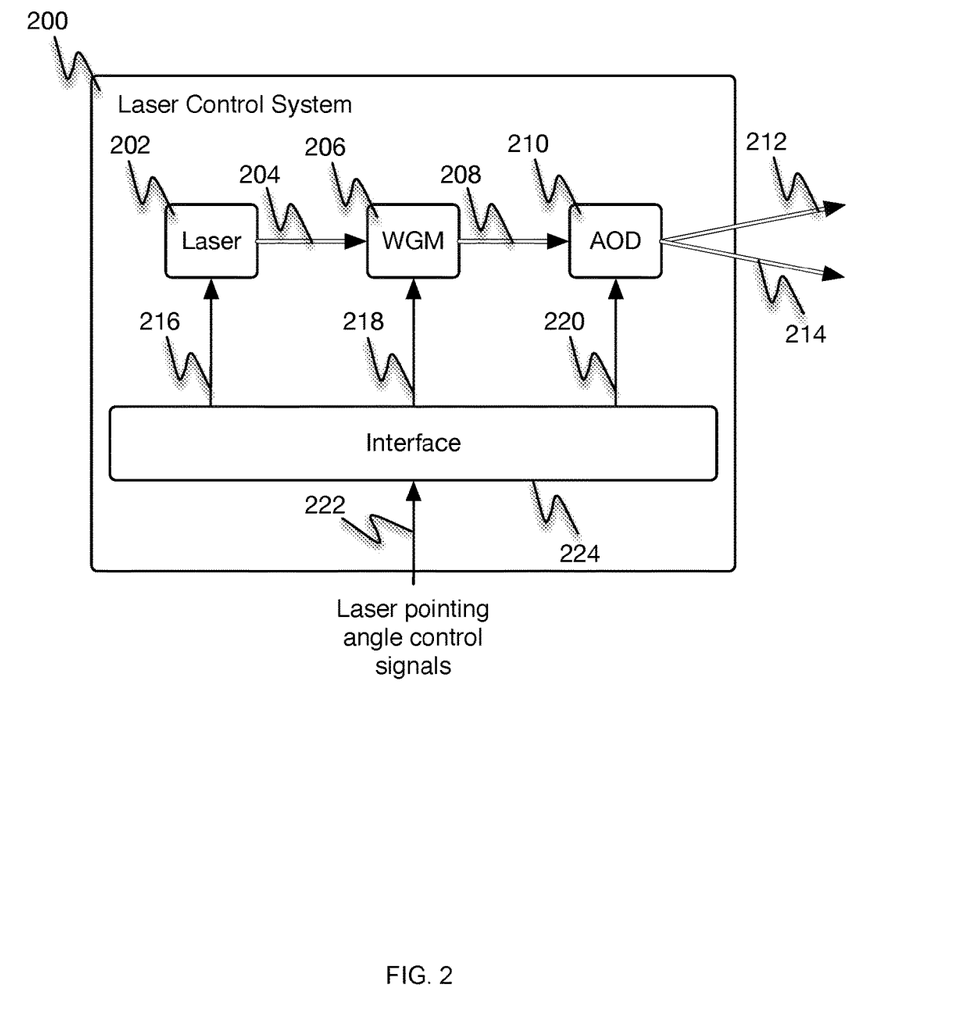
FIG. 2 is a block diagram illustrating an electro-optical laser control system for biasing and closed loop control of an atomic interferometer.

FIG. 2 is a block diagram illustrating an electro-optical laser control system for biasing and closed loop control of an atomic interferometer. In some embodiments, laser control system 200 implements laser control system 100 of FIG. 1. In the example shown, electro-optical laser control system 200 includes a waveguide modulator (WGM) 206 and an acousto-optic deflector (AOD) 210. Laser 202 generates interrogation beams 204, which pass through waveguide modulator 206 and subsequently through acousto-optic deflector 210 before intercepting the groups of atoms in the interferometer. In some embodiments, two or more frequencies of light are required to create the interrogation pulses. Laser 202, in combination with AOD 210 and WGM 206, generate light appropriate to create the two or more frequency signals required for the interrogation pulses. In laser control system 200, light which passes through WGM 206 is phase modulated to create one or more signals in addition to the signal generated by the laser. The frequency and phase of the additional one or more signals generated by WGM 206 is determined by the frequency and phase of the electronic microwave input 218 to WGM 206. The amplitude of the additional one or more signals generated by WGM 206 is determined by the amplitude of the electronic microwave input to WGM 206. Light from WGM 206 passes through AOD 210. Radio frequency (RF) input 220 to AOD 210 is comprised of two or more frequencies, which generate two or more deflected beams (e.g., beam 212 and beam 214). The frequency shift of the light and deflection angle of each deflected beam is proportional to each RF frequency applied. Power in beam 212 and beam 214 is controlled by the power of RF input 220 and interrogation beams 204. The power and frequencies of RF input 220 to AOD 210 and electronic microwave input 218 to WGM 206 are appropriate such that the beam 212 and beam 214 generate a Raman transition of atoms in the atomic interferometer. Interface 224 receives laser pointing angle control signals on line 222 from a laser pointing angle calculator and generates laser control input 216, WGM electronic microwave input 218, and radio frequency input 220. In some embodiments, multiple AODs with independent control frequencies can be used.

In some embodiments, the first pointing angle of the first interrogating laser beam or the second pointing angle of the second interrogating laser beam is controlled using an acousto-optic deflector.

In some embodiments, the laser control system controls a first phase of a first interrogating laser beam and a second phase of a second interrogating laser beam. In some embodiments, the first phase or the second phase is controlled using a waveguide modulator.

In some embodiments, the laser control system controls a first frequency of a first interrogating laser beam and a second frequency of a second interrogating laser beam. In some embodiments, the first frequency or the second frequency is controlled using a waveguide modulator.

In various embodiments, laser control system 200 controls a second pointing angle of a second interrogating laser beam where adjusting a first pointing angle or a second pointing angle includes determining a feed forward adjustment—for example, a model is determined from past behavior that is used to predict likely behavior of the system and is used to adjust the system in advance of the predicted behavior (e.g., the system moves in a circle and the error previously determined shows an error based on a circular motion which is used to predict a likely future error). In some embodiments, a first plane in which the first pointing angle is able to be adjusted is different from the second plane in which the second pointing angle is able to be adjusted.

Figure 3:
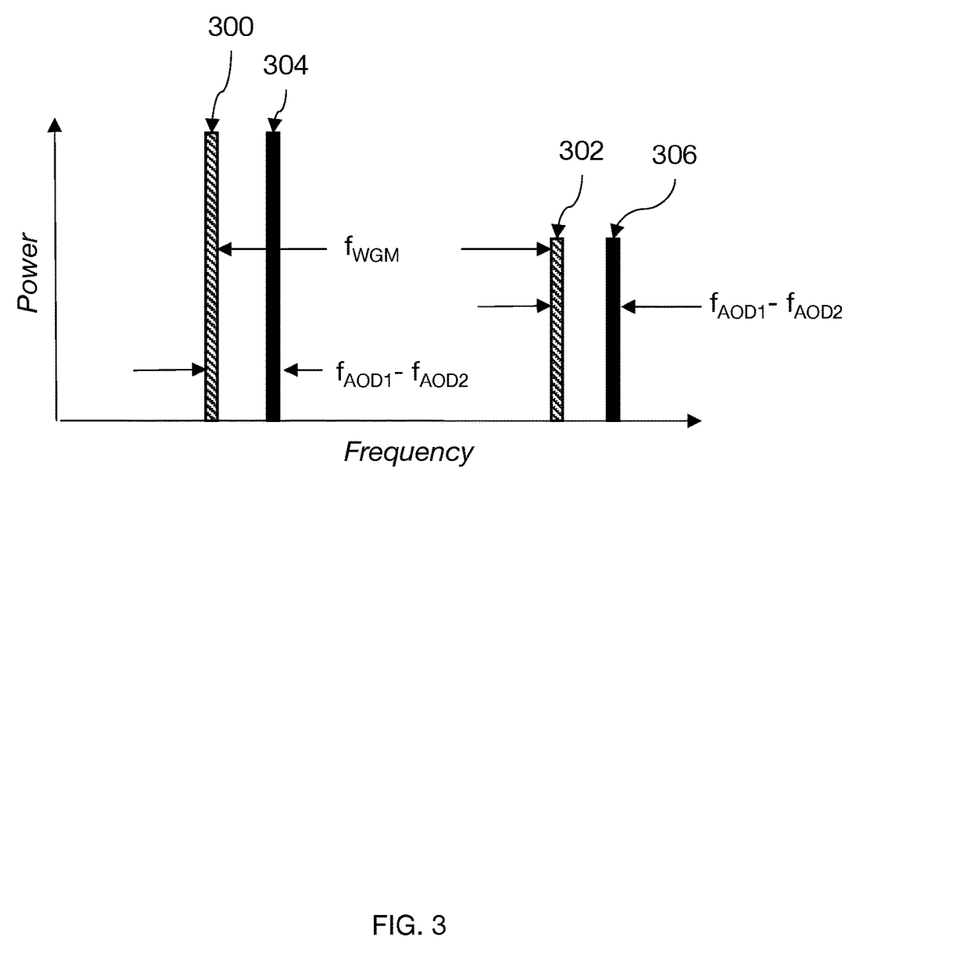
FIG. 3 is a plot of the power spectrum for deflected laser beam 1 and deflected laser beam 2.

FIG. 3 is a plot of the power spectrum for deflected laser beam 1 and deflected laser beam 2. In the example shown, the laser frequency is $f_0$ and the WGM applies a modulation to create at least one additional frequency $f_0+f_{WGM}$. The AOD has two or more RF input frequencies including $f_{AOD1}$ and $f_{AOD2}$. The output deflected beam 1 then contains at least the frequencies $f_0+f_{AOD1}$ 300 and $f_0+f_{WGM}+f_{AOD1}$ 302. The output deflected beam 2 then contains at least the frequencies $f_0+f_{AOD2}$ 304 and $f_0+f_{WGM}+f_{AOD2}$ 306. Values for $f_{WGM}$, $f_{AOD1}$ and $f_{AOD2}$ are chosen such that $f_0+f_{WGM}+f_{AOD1}-(f+f_{AOD2})+f_{Doppler}=f_{HF}$, where $f_{HF}$ is the frequency required to cause a two photon Raman transition and $f_{Doppler}$ represents a Doppler shift. In some embodiments, these frequencies are chosen to cause a Raman transition in $Rb^{87}$ and are approximately $f_{WGM}=6825$ MHz and $f_{AOD1}=90$ MHz and $f_{AOD2}=80$ MHz.

Figure 4:
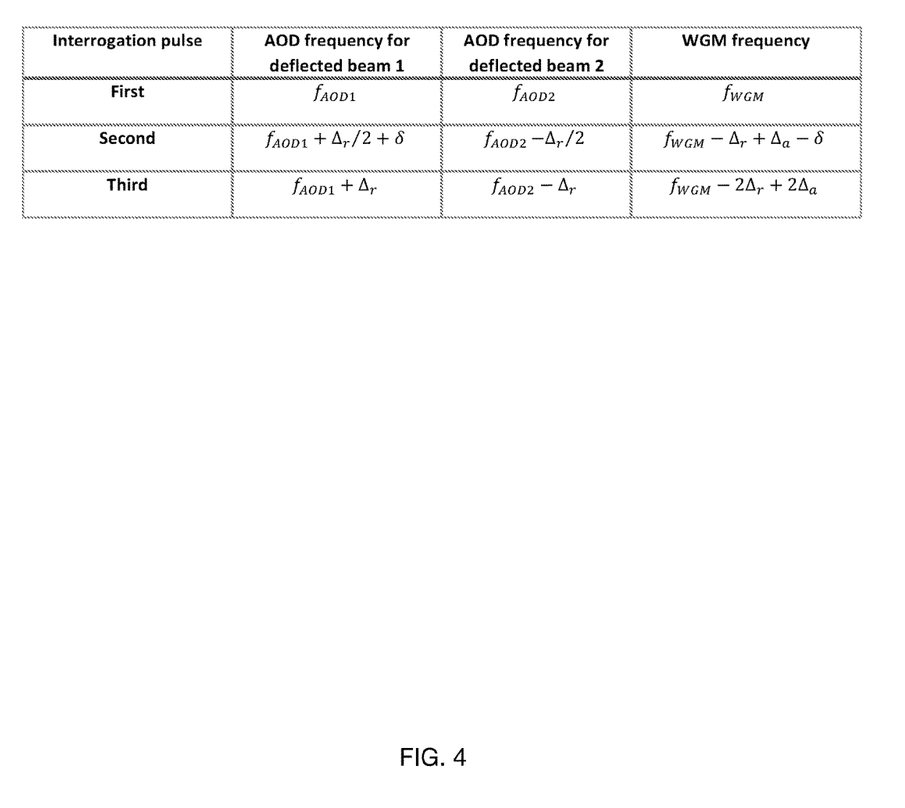
FIG. 4 is a table illustrating an embodiment of the frequency settings required to compensate for rotation.

FIG. 4 is a table illustrating an embodiment of the frequency settings required to compensate for rotation. In the example shown, a 3-pulse interferometer is used where the rotation rate of the sensor is constant over the interval from t=0 to 2T and both frequencies of each deflected beam are offset by the same but opposite amount. The particular sequence of AOD frequencies in listed FIG. 4 differs slightly from that illustrated in FIG. 6 where deflected beam 2 is fixed relative to the optical assembly, but the resulting compensation of rotation is the same by fixing the direction of the effective wavevector $k_{\mathit{eff}}$ with respect to an inertial reference frame. For example, to compensate for a rotation $\Omega$ the frequency $-\Delta_r$ is chosen to be $$\frac{\Omega T}{\eta}$$

where $\eta$ is the conversion factor from frequency to angle at the interrogation region. In order to effectively bias rotations, the control $-\Delta_r$ must impart opposite sign phase shifts to the atom clouds. In the presence of a constant rotation rate over the course of the interferometer sequence, the phase of an atom cloud at the end of the sequence is given by $\varphi=\varphi_1-2\varphi_2+\varphi_3$, where $\varphi_i$ represents the phase of the light at the time and location of the light pulse. Using this equation, the phase shift imparted by the angular deviations caused by the AOD is given by:

$$\varphi_A=2\eta\Delta f k_{\mathit{eff}} vT$$

$$\varphi_B = -2\eta\Delta f k_{eff} vT$$

$$\varphi_A - \varphi_B = 4\eta\Delta f k_{eff} vT$$

The phase difference is linear in the control frequency $-\Delta_r$. In addition to linearization of the output of the sensor, operating in closed loop mode can suppress loss of contrast that would limit sensitivity at high rotation rates. In some embodiments, the frequency shift δ in the second pulse compensates for possible optical assembly misalignments.

Figure 5:
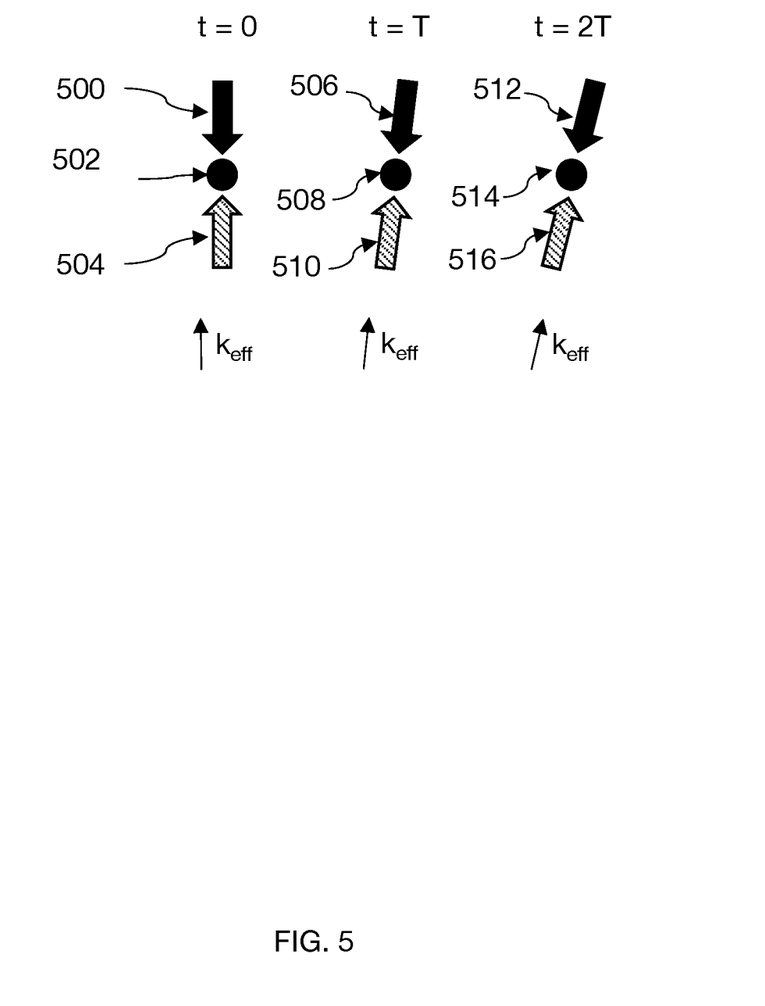
FIG. 5 is an illustration of the effect of rotation during which three interrogation pulses are performed.

FIG. 5 is an illustration of the effect of rotation during which three interrogation pulses are performed. A group of atoms 502 interacts with beam 500 and beam 504 at t=0 to create separate wave packets. As the optical assembly rotates at rate Ω, beams 500 and 504 (and $k_{eff}$) rotate to beams 506 and 510 in the reference frame of group of atoms 508 by an angle ΩT when the second interrogation pulse occurs at t=T. Similarly, beams 500 and 504 (and $k_{eff}$) rotate to beams 512 and 516 in the reference frame of group of atoms 514 by an angle 2ΩT for the third interrogation pulse at t=2T.

Figure 6A:
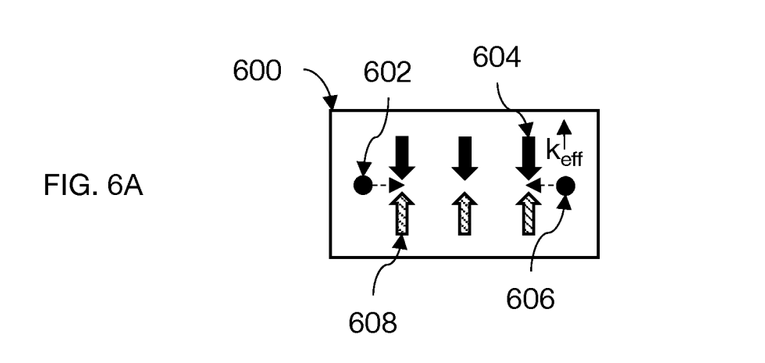
FIGS. 6A, 6B, and 6C illustrate how an electro-optical adjustment can be used to maintain the angle of effective wavevector $k_{\mathit{eff}}$ through biasing the interrogation beams to counteract the effect of rotation.
Figure 6B:
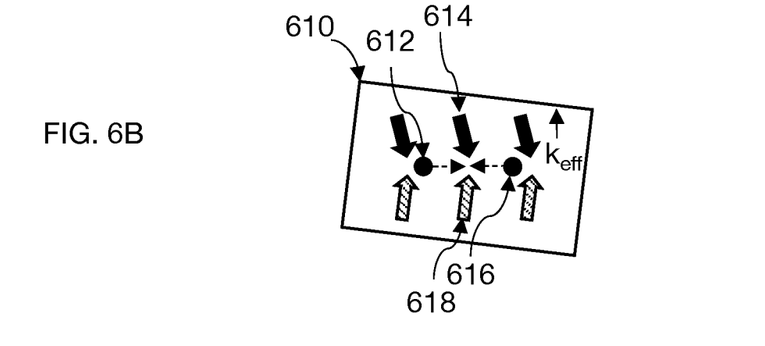
Figure 6C:
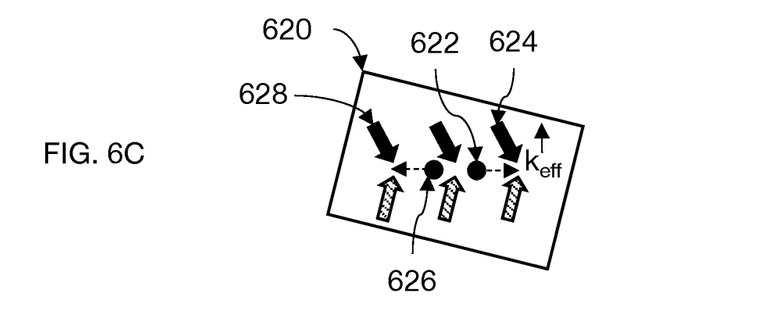

FIGS. 6A, 6B, and 6C illustrate how an electro-optical adjustment can be used to maintain the angle of effective wavevector $k_{eff}$ through biasing the interrogation beams to counteract the effect of rotation. In some embodiments, only one of the two angled beams are manipulated to bias rotation of the optical system relative to the trajectories of one or more groups of atoms. FIGS. 6A, 6B, and 6C describe the process of biasing the interrogation beams to counteract the effect of rotation. FIG. 6A shows two groups of atoms (atom cloud 602 and atom cloud 606) that are made to counter-propagate with substantially similar but opposite velocities (dotted arrows). The optical assembly (represented by box 600) generates three interrogation regions which are to be intercepted by the groups of atoms of atom cloud 602 and atom cloud 606. When the first group of atoms (atom cloud 602 after propagating to the space interrogated by set of interrogation beams 608) is in the first interrogation region and the second group of atoms (atom cloud 606 after propagating to the space interrogated by set of interrogation beams 604) is in the third interrogation region, the interrogation pulses are applied simultaneously. After some time, the first and second groups of atoms (atom cloud 612 and atom cloud 616) intercept the second interrogation region. As shown, the optical assembly rotates between these two times and the optical assembly 610 is at a new angle (FIG. 6B). Deflected beam 618 rotates with the optical assembly and deflected beam 614 has been manipulated to the appropriate angle for counteracting the rotation in order to maintain $k_{eff}$ relative to the groups of atoms. After some more time, first group of atoms 622 intercepts the third interrogation region and second groups of atoms 626 intercept the first interrogation region. As shown, optical assembly 620 rotates between these two times and optical assembly 620 is now at a new angle (FIG. 6C) Deflected beam 628 rotates with the optical assembly and deflected beam 624 has been manipulated to the appropriate angle to counteract the rotation to maintain $k_{eff}$. For each interrogation pulse, the frequency $f_{WGM}$ has also been modified to account for frequency changes of $f_{AOD1}$ which manipulates deflected beam 624 in order to meet the two-photon resonance condition.

Figure 7A:
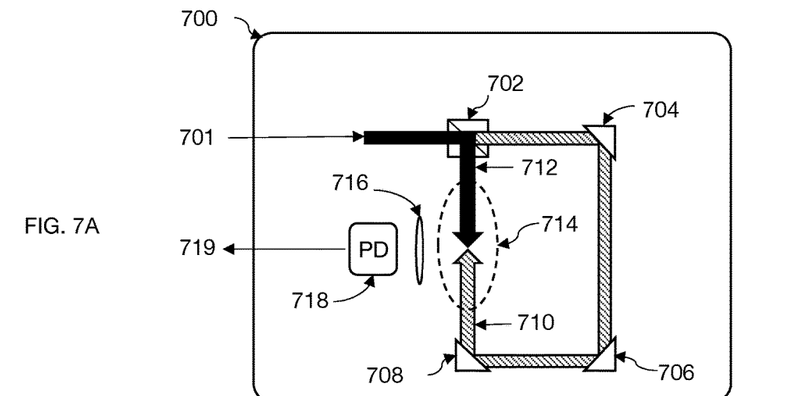
FIG. 7A is a diagram illustrating various embodiments of optical assemblies that may be used to implement rotation biasing in an atomic interferometer.

FIG. 7A is a diagram illustrating various embodiments of optical assemblies that may be used to implement rotation biasing in an atomic interferometer. In some embodiments, atomic interferometer 700 of FIG. 7A, atomic interferometer 720 of FIG. 7B, atomic interferometer 752 of FIG. 7C, may be used to implement atomic interferometer 104 of FIG. 1. In the example shown in FIG. 7A, a pair of angled laser beams 701 is made substantially parallel and overlapping by using an optical assembly consisting of various optical devices and materials including beam splitter 702, mirror 704, mirror 706, and mirror 708 and directed to another part of the optical assembly to create one single interrogation region 714. The mirrors and beam splitter are aligned to make the deflected beams substantially anti-parallel and overlapped in interaction region 714. Various optical elements may also be used to manipulate the polarization and amplitude of the deflected beams as appropriate to generate a Raman transition in the groups of atoms. In some embodiments, multiple interaction regions may be used. Light from interaction region 714 is collected via optics 716 and detected using photodiode 718 in order to generate an output photodiode signal 719. Photodiode signal 719 contains information about the atomic state of the atoms, and the state is determined by an atomic state determiner (e.g., atomic state determiner 108 of FIG. 1).

Figure 7B:
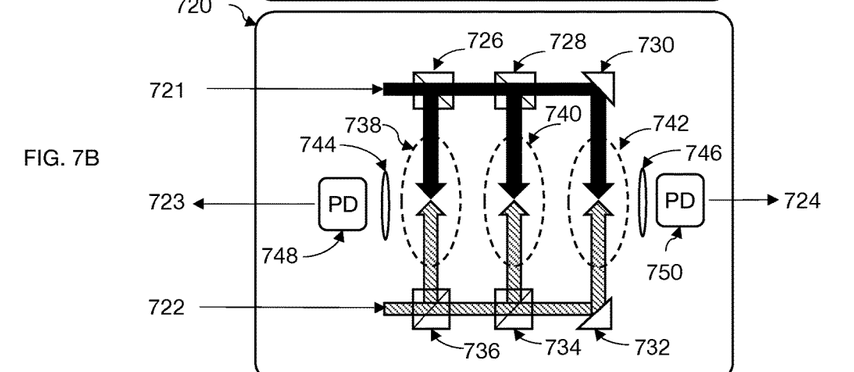
FIG. 7B is a diagram illustrating an embodiment of an optical assembly that may be used to implement rotation biasing in an atomic interferometer.

FIG. 7B is a diagram illustrating an embodiment of an optical assembly that may be used to implement rotation biasing in an atomic interferometer. In the example shown in FIG. 7B, pair of angled beams 721 are directed to an optical assembly consisting of beam splitter 726, beam splitter 728, beam splitter 734, beam splitter 736, mirror 730, and mirror 732, which are placed to create interrogation region 738, interrogation region 740, and interrogation region 742. The beam splitters and mirrors are aligned to make the deflected beams substantially anti-parallel and overlapped in the interaction regions, respectively. Various optical elements may also be used to manipulate the polarization and amplitude of the deflected beams as appropriate to generate a Raman transition in the groups of atoms. Light from interaction region 738 is collected via optics 744 and detected using photodiode 748 in order to generate output photodiode signal 723. Photodiode signal 723 contains information about the atomic state of the atoms and the state is determined by an atomic state determiner (e.g., atomic state determiner 108 of FIG. 1). Light from interaction region 742 is collected via optics 746 and detected using photodiode 750 in order to generate output photodiode signal 724. Photodiode signal 724 contains information about the atomic state of the atoms and the state is determined by an atomic state determiner (e.g., atomic state determiner 108 of FIG. 1).

Figure 7C:
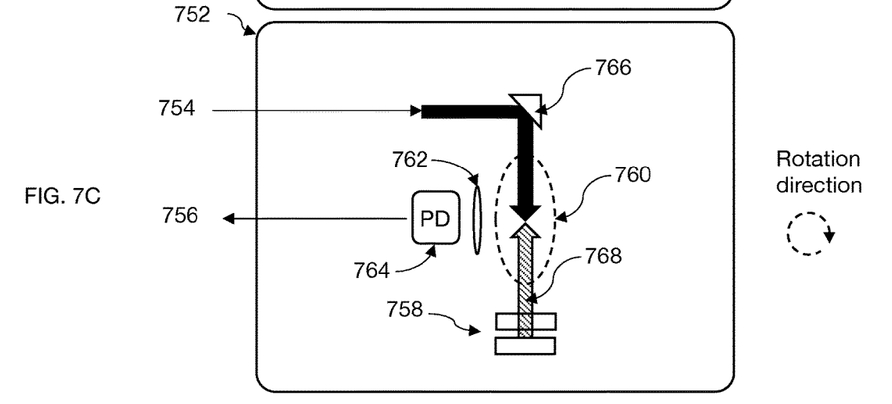
FIG. 7C is a diagram illustrating an embodiment of an optical assembly that may be used to implement rotation biasing in an atomic interferometer.

FIG. 7C is a diagram illustrating an embodiment of an optical assembly that may be used to implement rotation biasing in an atomic interferometer. In the example shown in FIG. 7C, a pair of angled beams 754 are made substantially parallel and overlapped by directing them to an optical assembly comprising mirror 766 and retroreflective device 758 in order to create interrogation region 760. Retroreflective device 758 may include a waveplate, polarizer and mirror and is designed to reflect only one of deflected beams 768. Various optical elements may also be used to manipulate the polarization and amplitude of the deflected beams as appropriate to generate a Raman transition in the groups of atoms. In some embodiments, interferometer 752 contains multiple interaction regions. In some embodiments, retroreflective device 758 allows both beams to be reflected in the event that the group of atoms have a velocity that allows discrimination between the pair of beams using Doppler shifts.

In some embodiments, similar methods are used to construct a plurality of interaction regions as necessary to create various types of atomic interferometers.

Figure 8:
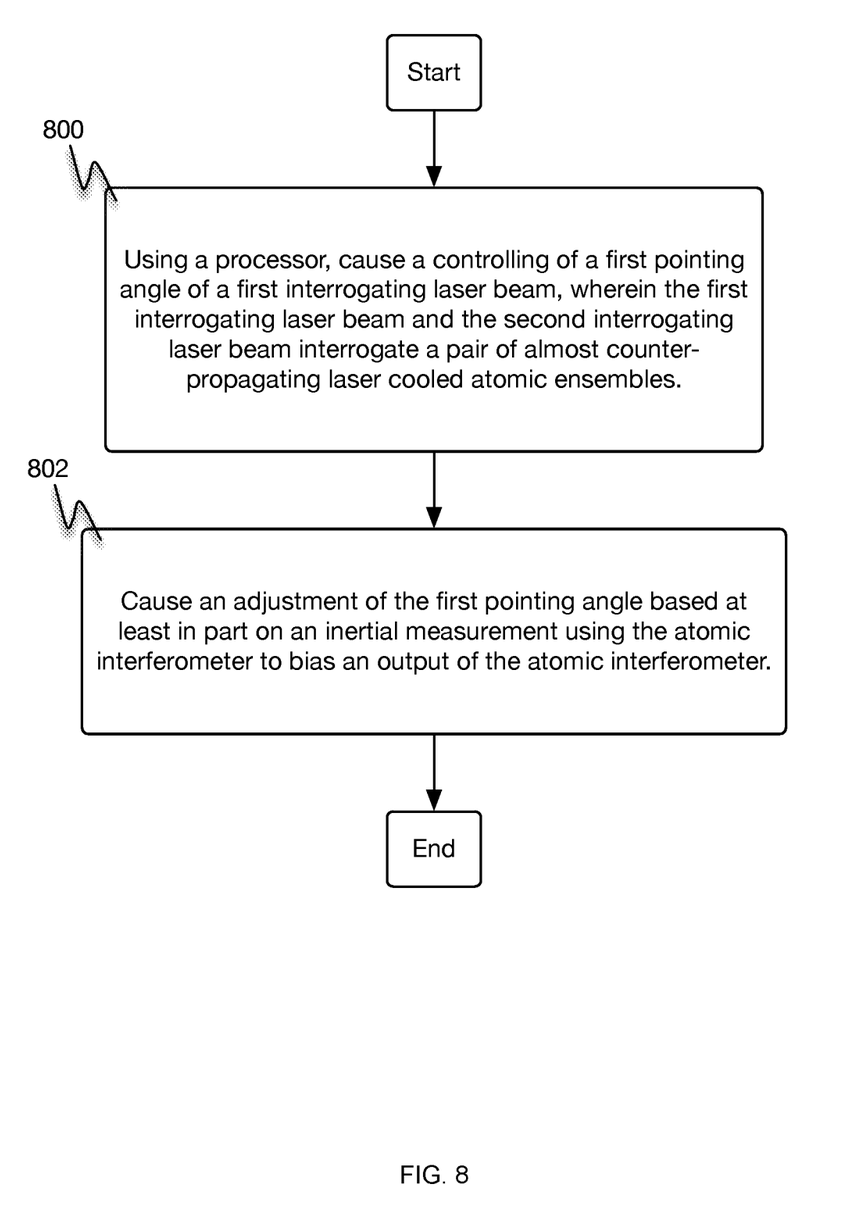
FIG. 8 is a flow diagram illustrating an embodiment of a method for automatic biasing and closed loop control of an atomic interferometer.

FIG. 8 is a flow diagram illustrating an embodiment of a method for automatic biasing and closed loop control of an atomic interferometer. In some embodiments, the process of FIG. 8 is executed using the system of FIG. 1. In 800, using a processor, a controlling of a first pointing angle of a first interrogating laser beam, where the first interrogating laser beam and the second interrogating laser beam interrogate a pair of almost counter-propagating laser cooled atomic ensembles is caused. In 802, an adjustment of the first pointing angle based at least in part on an inertial measurement using the atomic interferometer to bias an output of the atomic interferometer is caused.

In some embodiments, an initial measurement of interferometer phase is performed on two counter-propagating atom clouds with no AOD frequency shifts applied between pulses. The phase difference between the two clouds is related to rotations through $\Delta\varphi=4k_{eff}\Omega vT^2$. The control frequency $\Delta_r$ is updated via $\Delta_r=\Omega T/\eta$ to null the phase difference. A PID loop updates the control frequency continuously to keep the phase difference between the two clouds maintained at zero. The value of $\Delta_r$ is then linearly related to the rotation rate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an atomic interferometer, comprising:
   a laser control system, wherein the laser control system controls a first pointing angle of a first interrogating laser beam, wherein the first interrogating laser beam and a second interrogating laser beam interrogate a pair of almost counter-propagating laser cooled atomic ensembles; and
   a feedback control system, wherein the feedback control system adjusts the first pointing angle based at least in part on an inertial measurement using the atomic interferometer to bias an output of the atomic interferometer.

2. The system as in claim 1, wherein the first interrogating laser beam or the second interrogating laser beam interrogate the pair of almost counter-propagating laser cooled atomic ensembles at nominally perpendicular angles.

3. The system as in claim 1, wherein the feedback control system adjusts based at least in part on calculations of phase shifts measured from the pair of almost counter-propagating laser cooled atomic ensembles.

4. The system as in claim 1, wherein the first pointing angle of the first interrogating laser beam or a second pointing angle of the second interrogating laser beam is controlled using an acousto-optic deflector.

5. The system as in claim 1, wherein the laser control system controls a first phase of the first interrogating laser beam and a second phase of the second interrogating laser beam.

6. The system as in claim 5, wherein the first phase or the second phase is controlled using a waveguide modulator.

7. The system as in claim 1, wherein the laser control system controls a first frequency of the first interrogating laser beam and a second frequency of the second interrogating laser beam.

8. The system as in claim 7, wherein the first frequency or the second frequency is controlled using a waveguide modulator.

9. The system as in claim 1, wherein the first interrogation laser beam or the second interrogation laser beam is directed to a single interrogation region of a laser cooled atomic ensemble of the pair of almost counter-propagating laser cooled atomic ensembles.

10. The system as in claim 9, wherein the first interrogation laser beam and the second interrogation laser beam are substantially anti-parallel.

11. The system as in claim 9, wherein the first interrogation laser beam and the second interrogation laser beam are substantially parallel.

12. The system as in claim 1, wherein the first interrogation laser beam or the second interrogation laser beam is directed to three interrogation regions of a laser cooled atomic ensemble of the pair of almost counter-propagating laser cooled atomic ensembles.

13. The system as in claim 12, wherein the first interrogation laser beam and the second interrogation laser beam are substantially anti-parallel.

14. The system as in claim 1, wherein the laser control system controls a second pointing angle of the second interrogating laser beam.

15. The system as in claim 14, wherein adjusting the first pointing angle or the second pointing angle includes determining a feed forward adjustment.

16. The system as in claim 14, wherein a first plane in which the first pointing angle is able to be adjusted is different from a second plane in which the second pointing angle is able to be adjusted.

17. A method for an atomic interferometer, comprising:
   providing a laser control system, wherein the laser control system controls a first pointing angle of a first interrogating laser beam, wherein the first interrogating laser beam and a second interrogating laser beam interrogate a pair of almost counter-propagating laser cooled atomic ensembles; and
   providing a feedback control system, wherein the feedback control system adjusts the first pointing angle based at least in part on an inertial measurement using the atomic interferometer to bias an output of the atomic interferometer.

18. A method for an atomic interferometer, comprising:
   causing, using a processor, a controlling of a first pointing angle of a first interrogating laser beam, wherein the first interrogating laser beam and a second interrogating laser beam interrogate a pair of almost counter-propagating laser cooled atomic ensembles; and
   causing an adjustment of the first pointing angle based at least in part on an inertial measurement using the atomic interferometer to bias an output of the atomic interferometer.

19. A computer program product for an atomic interferometer, the computer program product being embodied in a non-transitory computer readable storage medium and comprising computer instructions for:
   causing, using a processor, a controlling of a first pointing angle of a first interrogating laser beam, wherein the first interrogating laser beam and a second interrogating laser beam interrogate a pair of almost counter-propagating laser cooled atomic ensembles; and
   causing an adjustment of the first pointing angle based at least in part on an inertial measurement using the atomic interferometer to bias an output of the atomic interferometer.

\* \* \* \* \*

UNITED STATES PATENT AND TRADEMARK OFFICE
CERTIFICATE OF CORRECTION

PATENT NO. : 10,444,016 B1
APPLICATION NO. : 16/019042
DATED : October 15, 2019
INVENTOR(S) : Mark A. Kasevich et al.

It is certified that error appears in the above-identified patent and that said Letters Patent is hereby corrected as shown below:

Column 7, Line 16, after "angle", delete "QT" and insert --$\Omega T$--, therefor.

Signed and Sealed this
Thirty-first Day of March, 2020

Andrei Iancu
*Director of the United States Patent and Trademark Office*